(12) United States Patent
Hugosson et al.

(10) Patent No.: US 11,515,961 B2
(45) Date of Patent: Nov. 29, 2022

(54) ENCODING DATA ARRAYS

(71) Applicant: Arm Limited, Cambridge (GB)

(72) Inventors: Sven Ola Johannes Hugosson, Lund (SE); Jakob Axel Fries, Malmo (SE); Hakan Lars-Goran Persson, Bjärred (SE); Muhammad Ali Shami, Malmo (SE)

(73) Assignee: Arm Limited, Cambridge (GB)

( * ) Notice: Subject to any disclaimer, the term of this patent is extended or adjusted under 35 U.S.C. 154(b) by 184 days.

(21) Appl. No.: 17/078,047

(22) Filed: Oct. 22, 2020

(65) Prior Publication Data

US 2021/0126736 A1 Apr. 29, 2021

(30) Foreign Application Priority Data

Oct. 24, 2019 (GB) .................................. 1915449

(51) Int. Cl.
*H04L 1/00* (2006.01)
*H04L 45/74* (2022.01)

(52) U.S. Cl.
CPC ............ *H04L 1/0009* (2013.01); *H04L 45/74* (2013.01)

(58) Field of Classification Search
CPC ....... H04L 1/0009; H04L 45/74; G06T 9/008; G06T 9/00; G06T 1/60; H04N 19/124; H04N 19/426; H04N 19/182; H04N 19/157; H04N 19/176; H04N 19/184; H04N 19/44; H04N 19/70
See application file for complete search history.

(56) References Cited

U.S. PATENT DOCUMENTS

| | | | |
|---|---|---|---|
| 2007/0110151 A1 | 5/2007 | Yu | |
| 2012/0224640 A1* | 9/2012 | Sole Rojals | H04N 19/176 |
| | | | 375/240.18 |
| 2016/0050427 A1* | 2/2016 | Berry | H04N 19/93 |
| | | | 375/240.01 |
| 2016/0373788 A1* | 12/2016 | Gamei | H04N 19/61 |

(Continued)

FOREIGN PATENT DOCUMENTS

WO 2020/115471 6/2020

OTHER PUBLICATIONS

Combined Search and Examination Report dated Aug. 10, 2020, GB Patent Application No. GB1915449.1.

(Continued)

*Primary Examiner* — Walli Z Butt
(74) *Attorney, Agent, or Firm* — Vierra Magen Marcus LLP

(57) ABSTRACT

When encoding a block of data elements in an array of data elements, the data values for data elements in the block are represented and stored in a data packet as truncated data values using a subset of one or more most significant bits of the respective bit sequences for the data values of the data elements. A rounding mode is selected from a plurality of available rounding modes that can be applied when decoding the block of data elements and an indication of the selected rounding mode is provided along with the encoded data packet. The rounding mode is associated with one or more rounding bit sequence(s) that can then be applied to the truncated data values when decoding the data packet to obtain decoded data values for the data elements in the block.

17 Claims, 5 Drawing Sheets

(56) References Cited

U.S. PATENT DOCUMENTS

2017/0085879 A1    3/2017   Minoo

OTHER PUBLICATIONS

JCT-VC Meeting; 2011, Li X et al, "Adaptive-De-Quantization Offset" URL: http://phenix.intevry.fr/jct/doc_enduser/documents/5_Geneva/wgll/JCTVC-E091-v3.zip paragraph 1 "Introduction".
ICT-VC Meeting, 2012, Naccari M et al, "Improving HEVC compression efficiency by intensity dependant spatial quantisation" http://WFTP3.ITU.INT/AV-ARCH/ICTVC-SITE/ paragraphs 2 and 3 with figures 2 and 3.
Proceedings of the SIGGRAPH/Eurographics Workshop on Graphics Hardware, 2003, Feeney S., "Texture compression using low-frequency signal modulation," pp. 84-91.

* cited by examiner

ENCODING DATA ARRAYS

BACKGROUND

The technology described herein relates to a method of and apparatus for encoding data in data processing systems, and in particular to methods for compressing and storing image data such as texture or frame buffer data in graphics processing systems. Also described are a corresponding decoding method and apparatus.

Graphics processing systems often store generated image data within a frame buffer. The frame buffer typically contains a complete set of data for a frame (image), e.g. that is to be displayed, including, for example, brightness (luma) values for each of the (e.g.) pixels within that frame (e.g. when the image data represents a grayscale image). A suitable display driver is then able to read the contents of the frame buffer and use the image data stored therein to drive a display to display the desired frame (image).

However, the storage and access of the image data in the frame buffer (the 'frame buffer data') can place relatively high demands on the, e.g., storage and/or bandwidth resource of the data processing system (or conversely lead to a reduced performance when such demands are not met).

To reduce the burden imposed on the graphics processing system, it is therefore desirable to be able to store such frame buffer data in a "compressed" format. This is particularly desirable in data processing apparatus, e.g. of portable devices such as digital cameras, or mobile devices including such cameras, where processing resources and power may be relatively limited.

Another example, also in the context of graphics processing, would be when storing texture data, e.g. in the form of an array of texture elements (or 'texels') each representing given texture data (such as colour, luminance, etc.) that can then be mapped onto respective sampling positions (e.g. pixels) of a render output being generated. Again, the storage and access of this texture data can place relatively high storage and/or bandwidth requirements on the data processing system.

Of course similar considerations apply to various other instances of data processing where it is desired to reduce the amount of data needed for the storage and/or transmission of a certain piece of information.

Accordingly, it is common when processing data to encode arrays of data elements so as to compress the data in order to reduce bandwidth and memory consumption. To this end, various data compression schemes have been developed.

Some data compression schemes encode the data in a lossless manner such that the original array of data elements can be perfectly reconstructed from the encoded data. However, for some applications it may be acceptable to lose some output fidelity and it may be more desirable to be able to guarantee a given bandwidth (bit rate).

Thus, other data compression schemes may encode to fixed-size data packets. In that case, the compression into the fixed size data packets is inherently 'lossy' (since once a fixed size data packet is full any remaining bits are not then included into the data packet and those bits are therefore effectively discarded at this point, and the information associated with the discarded bits is therefore lost).

The Applicants believe that there remains scope for improved arrangements for encoding data, especially when using such lossy compression schemes.

BRIEF DESCRIPTION OF THE DRAWINGS

Various embodiments of the technology described herein will now be described by way of example only and with reference to the accompanying drawings, in which.

The drawings show elements of data processing apparatuses and systems that are relevant to embodiments of the technology described herein. Like reference numerals represent like elements in the drawings, as appropriate.

DETAILED DESCRIPTION

Figure 1:
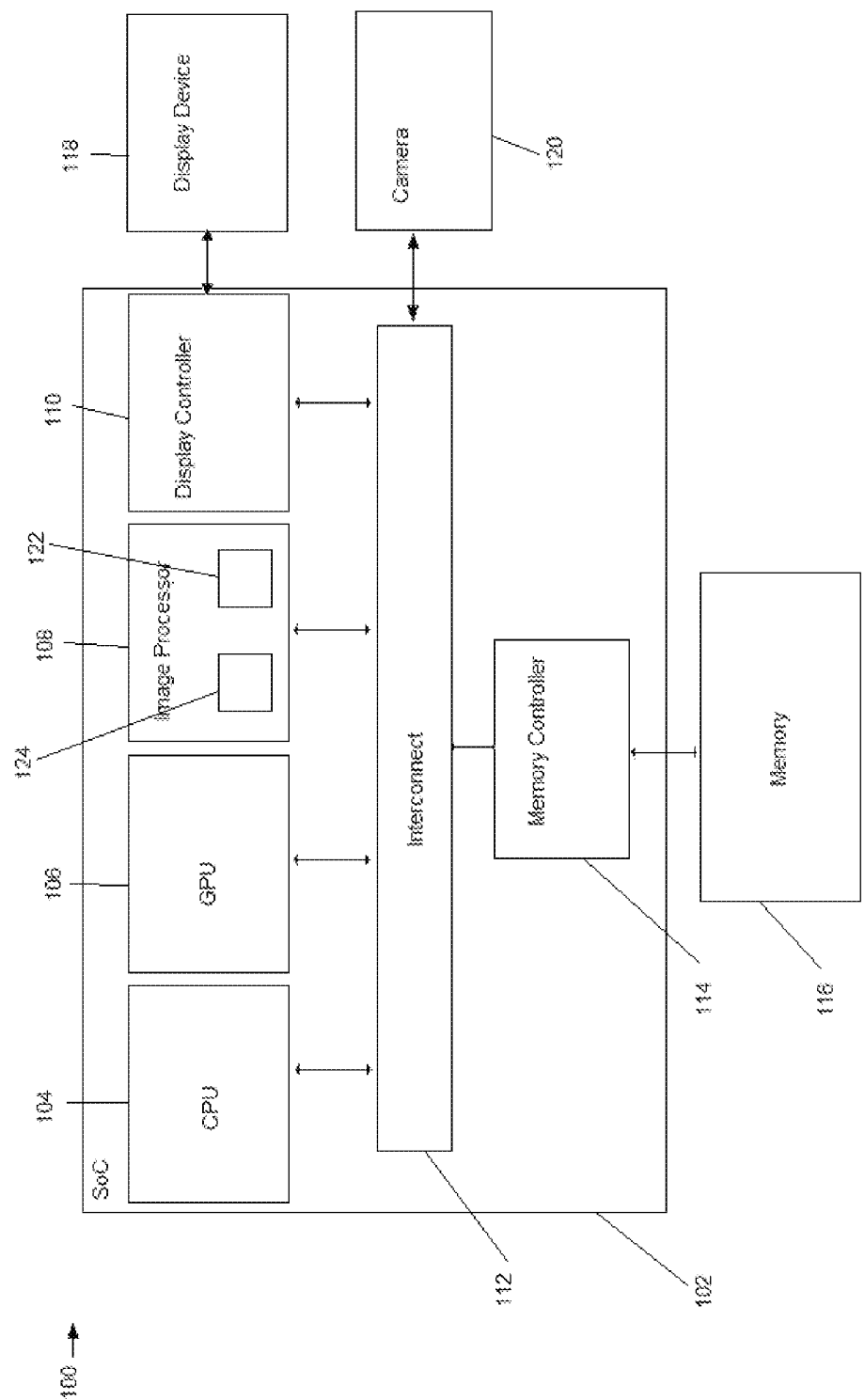
FIG. 1 shows schematically an example of a data processing system within which embodiments of the technology described herein may be implemented.

A first embodiment of the technology described herein comprises a method of processing an array of data elements, each data element having an associated data value that is represented by a respective bit sequence, the method comprising:

for a block of data elements in the array of data elements:
representing the data values for each of the data elements in the block of data elements as truncated data values using a subset of one or more most significant bits of the respective bit sequences for the data values of the data elements; and
selecting from a plurality of available rounding modes a rounding mode to be applied when decoding the block of data elements, wherein each rounding mode is associated with one or more rounding bit sequence(s), and wherein the rounding mode to be applied when decoding the block of data elements is selected by:
determining a first representative value for the block of data elements based on data values for data elements in the block of data elements;
determining a corresponding representative value for the block of data elements for at least one of the plurality of available rounding modes, wherein the representative value for a rounding mode is determined based on truncated data values for data elements in the block of data elements and the respective rounding bit sequence(s) associated with the rounding mode;
comparing the first representative value for the block of data elements determined based on the data values to the corresponding representative value determined for the at least one of the plurality of available rounding modes to determine which of the plurality of available rounding modes gives a representative value that is closest to the first representative value; and
selecting the rounding mode to be applied when decoding the block of data elements based on which of the plurality of available rounding modes is determined to give a representative value that is closest to the first representative value that was determined for the block of data elements;
the method further comprising:
encoding the block of data elements by storing the truncated data values for the data elements as a data packet representing the block of data elements and providing for the data packet data indicative of the rounding mode that is to be used when decoding the data packet; and when it is desired to use the data value(s) for one or more of the data element(s) in the block of data elements that has been encoded into the data packet, the method subsequently comprising:

passing the data packet to a decoder circuit for decoding together with the data indicative of the rounding mode that is to be used when decoding the data packet;

extracting the truncated data value(s) for the one or more data element(s); and adding the rounding bit sequence(s) associated with the indicated rounding mode to the truncated data value(s) to obtain decoded data value(s) for the one or more data element(s) in the block of data elements.

A second embodiment of the technology described herein comprises a data processing system for processing an array of data elements, each data element having an associated data value that is represented by a respective bit sequence, the data processing system comprising:

an encoder circuit that is configured to:

for a block of data elements in the array of data elements:

represent the data values for each of the data elements in the block of data elements as truncated data values using a subset of one or more most significant bits of the respective bit sequences for the data values of the data elements; and select from a plurality of available rounding modes a rounding mode to be applied when decoding the block of data elements, each rounding mode being associated with one or more rounding bit sequence(s), wherein the selection of the rounding mode is performed by a rounding mode selection circuit that is configured to:

determine a first representative value for the block of data elements based on data values for data elements in the block of data elements;

determine a corresponding representative value for the block of data elements for at least one of the plurality of available rounding modes, wherein the representative value for a rounding mode is determined based on truncated data values for data elements in the block of data elements and the respective rounding bit sequence(s) associated with the rounding mode;

compare the first representative value for the block of data elements determined based on the data values to the corresponding representative values determined for the at least one of the plurality of available rounding modes to determine which of the plurality of available rounding modes gives a representative value that is closest to the first representative value; and select the rounding mode to be applied when decoding the block of data elements based on which of the plurality of available rounding modes is determined to give a representative value that is closest to the first representative value that was determined for the block of data elements;

the encoder circuit being further configured to:

encode the block of data elements by storing the truncated data values for the data elements as a data packet representing the block of data elements and providing for the data packet data indicative of the rounding mode that is to be used when decoding the data packet;

the data processing system further comprising a decoder circuit that is configured to:

when it is desired to use the data value(s) for one or more of the data element(s) in a block of data elements that has been encoded into a data packet:

extract the truncated data value(s) for the one or more data element(s) in the block of data elements; and add the rounding bit sequence(s) associated with the indicated rounding mode to the truncated data value(s) to obtain decoded data value(s) for the one or more data element(s) in the block of data elements.

The technology described herein generally relates to the encoding of blocks of data elements into data packets, e.g. to compress the data. In the technology described herein a rounding "mode" is selected (from a plurality of available rounding modes) for a block of data elements that is being encoded, and the selected rounding mode (i.e. at least data indicative thereof) is then provided, e.g. to a suitable decoder (circuit), alongside, or in an embodiment as part of, the data packet for the block. Each rounding mode is associated with one or more rounding bit sequence(s). The rounding bit sequence(s) for the selected rounding mode can then be (and is/are) applied to the data elements in the block of data elements when the data packet is subsequently being decoded, e.g. to obtain a decoded output.

When a data packet that has been encoded in this manner, i.e. for which data indicative of a selected rounding mode has been provided, is subsequently decoded, the decoder (circuit) is thus able to determine the rounding mode that has been provided for the data packet and then add the rounding bit sequence(s) associated with the indicated rounding mode to the (encoded) data values for each of the data elements in the block of data elements.

The rounding bit sequences associated with the different rounding modes thus act as respective rounding 'modifiers' that can be (and are) added to the truncated data values at the decoder (circuit).

The selected rounding mode for a block of data elements can thus be (and is) applied by the decoder (circuit) on a per block basis to modify the data values for all of the data elements within the block of data elements that have been encoded into the data packet in order to obtain a decoded output.

In this way, by determining and selecting the (most) appropriate rounding mode from a set of available rounding modes to be applied for a block of data elements, it has been found that it may be possible to facilitate an improved reproduction of the original data, and in particular to reduce the unwanted appearance of coarse steps (or jumps) in the data values that may otherwise occur at least for some encoding schemes, as will be explained further below.

In particular, the selection of a rounding mode to be applied for a block of data elements according to the technology described herein is advantageously performed in conjunction with a (lossy) encoding scheme in which the encoding of a block of data elements involves truncating the bit sequence representations of the data values for the data elements within the block such that the data value for a data element in the block of data elements is represented using only a subset of one or more most significant bits of the respective bit sequence representation of the original data value (a 'truncated' data value), and only these subsets of most significant bits (the truncated data values) for the respective data elements are included into the encoded data packet.

(For the avoidance of doubt it will be understood that the most significant bit (singular) for a bit sequence is the highest bit position. The most significant bits (plural) are the bits closest to, and including, the most significant bit. For example, for a bit sequence containing N bits, with the $N^{th}$ bit representing the highest value (the most significant bit), the most significant bits may then include the $N^{th}$ bit, the $N-1^{th}$ bit, and so on.)

Thus, the technology described herein encodes a block of data elements by truncating the bit sequences representing the data values for each of the data elements within the block of data elements to give corresponding 'truncated data values' for the data elements, the truncated data values including only a subset of one or more most significant bits from the bit sequence representation of the original data values.

Truncating the bit sequences (i.e. data values) in this way may thus provide the desired compression of the data. However, naturally any information that was represented by the less significant bits that were not included into the data packet is lost as a result of this truncation. The effect of this is that there is then less information that can be represented in the decoded output.

This may be the case, for example, when the block of data elements is being encoded in a 'raw' format into a fixed-size data packet. In that case, once the data packet is full, any remaining bits are effectively discarded. The encoding into a fixed size data packet is thus inherently lossy.

Thus, in embodiments, an array of data elements is divided (at least for encoding purposes) into a number of blocks of data elements that can be independently encoded/decoded and each block is allocated a certain bit budget (size) to guarantee that each block is encoded into a fixed-size data packet. The most significant bits for the data elements for each block are in an embodiment then encoded in their 'raw' form (by including the bit value into the data packet 'as is') starting with the highest bit values for each of the data elements (i.e. the most significant bit), and, so long as there is still space available in the data packet, after adding the highest bit values for each of the data elements, moving to the next highest bit values for the data elements, and so on, until the data packet is full (the allocated bit budget has been used).

As part of this encoding scheme, the order in which the bit values for the data elements are added into the data packet is in an embodiment varied, in an embodiment in a random fashion, e.g. such that the order in which the data elements are processed when adding the highest bit values into the data packet may be different to the order in which the data elements are processed when adding the next highest bit values into the data packet, and so on. In an embodiment the order in which bits are added into the data packet is also varied between different blocks of data elements, e.g. in the overall array of data elements and/or in a sequence of such arrays. This may help avoid introducing repeating artefacts across the decoded output. For instance, if the data elements for all of the blocks within the overall array of data elements were always processed in the same order, a greater number of bits may be included into the data packet for the data elements that are processed first, and this may introduce a repeating pattern into the decoded output, e.g. based on the division of the array into blocks.

Thus, the encoding scheme according to the technology described herein in an embodiment stores as many most significant bits for the data elements in the block of data elements as possible within the allotted bit budget whilst still ensuring a fixed-size data packet for the block. However, depending on the desired (fixed) size for the data packet, i.e. the number of bits that have been allocated for the data packet, this may mean that only a subset of, e.g. only one or two, most significant bit values are included into the data packet for each data element within the block (with the least (or less) significant bits not being included into the data packet).

The present Applicants have recognised that in this case, when such data packets are subsequently decoded, a decoded output obtained based (solely) on the truncated data values may then contain artefacts, particularly in the form of relatively coarse steps in the data values.

For example, in some embodiments, the array of data elements may represent an array of grayscale image data, wherein each of the data elements is associated with a luma value (representing the respective luma value at the spatial position (sample) associated with the data element).

By way of illustration, consider a typical case wherein it is desired to encode an 8×8 block of 8-bit luma samples into a 128-bit fixed-size data packet. If the entire 128-bit bit budget for the data packet were available for the luma samples (although it will be appreciated that this may typically not be the case, and in embodiments is not the case, e.g. as some of the allocated bits are in an embodiment used for signalling the encoding scheme and/or rounding mode, etc., e.g. in a suitable header for the data packet, such that typically less than all of the 128 bits may be available for encoding the luma values, as will be explained further below), this means that there would only be two bits available for each luma sample.

Thus, when applying the encoding scheme in the embodiment described above, the bit values for the two most significant bits (only) for each luma sample (i.e. the value for the highest bit position (the most significant bit) and the value for the next highest bit position) are added into the data packet 'as is' (in their 'raw' format).

However, the data packet is then 'full' since the entire bit budget has been used, and the remaining (less significant) bits for the luma samples are not added into the data packet (and the information associated with the less significant bits is therefore lost).

It will be appreciated that depending on the desired level of compression the data values may therefore be aggressively truncated, and a significant amount of information lost. For example, for the 8-bit samples in this illustrative example this means that the truncated data values are then restricted to having values of '0' (<u>00</u>000000), '64' (<u>01</u>000000), '128' (<u>10</u>000000) or '192' (<u>11</u>000000) (compared to the original 256 values spanning from 0 to 255).

The effect of this is that there may thus be relatively coarse brightness steps in the decoded image (or sequence of images) as without using the least significant bits it may not be possible to represent smoother variations in brightness. For instance, these brightness steps may be especially visible during brightness fadings, e.g., where a particular block in a sequence of images is to be faded in from black (Y=0) white (Y=256) over time.

During such brightness fadings, all of the luma samples within a single block, which typically represents only a portion of the overall image, may be expected to have similar (or even the same) brightness values (although this need not be the case). When fading the brightness, it is typically desired for the brightness of the blocks to be gradually faded such that there is a smooth variation throughout the sequence of images. However, in the example above, rather than providing the desired smooth fading effect the brightness of the block would change in relatively coarser steps, e.g., jumping from 0 to 64 to 128 to 192.

Although an example has been presented in the context of a block of luma samples, it will be appreciated the problems illustrated above may generally apply to any other types of data (arrays) that may suitably and desirably be encoded in this fashion.

These problems can be mitigated using the technology described herein. In particular, as explained above, the technology described herein proposes using a rounding 'modifier' that can be applied by the decoder (circuit) on a per block basis such that the decoder in an embodiment adds a certain value (i.e. in the form of a specified rounding bit sequence) to each of the truncated data values (bit sequences) for the data elements within the block of data elements. The rounding mode to be used for a block is selected from a set of plural available rounding modes and this therefore allows for a finer grained control of the data values for the decoded block (compared to using the truncated data values alone), e.g. such that smoother variations in the data values between blocks can be reproduced in the decoded output.

Thus, when encoding the data, the encoder (circuit) analyses the original block of data elements and determines which rounding mode will give the best reconstruction of the original data when added to the truncated data values for the block. The rounding mode that is determined to give the best reconstruction of the original data is then selected as the rounding mode for the block of data elements. For example, in the case of a block of luma samples, the rounding mode for a particular block of data elements may be selected such that that the apparent (e.g.) brightness of the reconstructed block most closely represents the brightness of the original block sent to the encoder.

To select a rounding mode for a block of data elements an analysis is performed to allow a comparison to be made between the original data values and the values that would be obtained in the decoded output based on the truncated data values with the different rounding modes applied.

To facilitate this comparison a first representative value for the block of data elements is determined using the original data values. The first representative value may be determined based on the data values either directly or indirectly and in any suitable fashion. For instance, in some embodiments, the original data values may be processed or converted into a different form, e.g. in order to facilitate the determination of the first representative value. This may, for example, comprise truncating the original data values (but to a lesser extent than the truncation used for encoding the data values). Various other arrangements would be possible in this regard.

The representative value may effectively represent of an 'average' of the data values within the block. The representative value could represent a 'true' average (e.g. the mean) data value for the data elements within the block, or may merely be representative of an estimate or approximation of the 'average' data value for the block. Indeed, in general, the first representative value may be determined in any suitable fashion, as desired, in order to provide a suitably representative value that can be used in the manner described herein.

Thus, in embodiments, a representative value is calculated for a block of data values as a function of at least some of the data values for the data elements in the block. The calculation of the representative value may be performed in any suitable and desired fashion, e.g. depending on what the block of data values represents.

For instance, in some embodiments, the representative value may simply comprise a sum of the data values for the data elements in the block (or a sum of at least some of the data values for the data elements in the block). In general, it will be appreciated that any suitable algebraic function may be applied to the data values for the data elements in the block in order to determine the representative value. This may involve, for example, determining a weighted sum, or a sum of squares or other power values.

In particular, the manner in which the representative value is determined may depend on the type of data, e.g. and the desired level of precision. For example, where the data values represent luma values the representative value is in an embodiment determined using a sum of the squared data values. This may be appropriate to approximate the non-linear relationship between the luma values and the perceived brightness (i.e. a luma value of 128 is not half as bright as a luma value of 256, and in fact the relationship is described by a gamma curve, involving the power 2.2, and so summing squares provides a reasonable approximation). It will be appreciated that, e.g., colour (e.g. RGBA) and chroma (UV) values may also be treated in a similar fashion.

Thus, in embodiments, determining the first representative value comprises performing a sum of the squares of the data values for at least some of the data elements within the block; and determining the representative value for a respective rounding mode comprises performing a sum of the squares of modified data values for at least some of the data elements within the block, wherein the modified data value for a data element is obtained by adding the respective rounding bit sequence associated with the rounding mode to the truncated data value for the data element.

However, various other arrangements would of course be possible, and the representative value may be determined in a more or less sophisticated manner, as desired.

For instance, various other algebraic optimisations may be performed in order to facilitate a hardware calculation of the representative value. For example, this could be done by algebraically expanding the function used to determine the representative value and removing terms that only provide relatively small contributions to the result.

It will be appreciated that the representative value need not be calculated using every data element in the block, and the calculation could use only a certain subset of the data elements within the block. For example, the representative value may be calculated using every other data element. Or, the representative value may be calculated using a sub-block of data elements within the block. This may help to simplify the calculation whilst still providing a suitably representative value for the block of data elements, as desired (especially because it may typically be expected that the data elements within a single block have similar data values).

Once a first representative value for the block has been determined using (at least some of) the original data values for the data elements in the block, in whichever manner this is done, a corresponding representative value is then determined in a similar fashion for at least one of, and in an embodiment for each of, the plurality of available rounding modes. A comparison is then made between the first representative value determined from the original data values and the corresponding representative value obtained for the at least one, and in an embodiment for each of, the plurality of available rounding modes in order to determine the rounding mode that gives the closest match to the first representative value. The rounding mode that gives the closest match to the first representative value is then selected accordingly as the rounding mode to be used for the block.

Thus, the corresponding representative values determined for the different available rounding modes are in an embodiment determined in the same way (e.g. using the same function) as the first representative value but replacing the data values for the data elements in the block with the associated truncated values with the respective rounding bit sequence(s) associated with the rounding mode added thereto, i.e. replacing the original data values with the modified data values that would be generated in the decoded output for the respective rounding mode.

That is, in embodiments, the representative value associated with a particular rounding mode is determined by modifying the truncated data values by adding the associated rounding bit sequence(s) thereto, and then determining the representative value based on such modified truncated data values.

For instance, if the first representative value, X, is defined by some function, f, of the original data values, $\{x_i\}$: $X=f(x_1, x_2, \ldots, x_n)$, the corresponding representative value, $Y_R$, for a rounding mode may be determined by the same function but applied to the truncated data values $\{y_i\}$ modified by the appropriate rounding modifier for that data value, $R_i$, i.e.: $Y_R=f(y_1+R_1, y_2+R_2, \ldots, y_n+R_n)$.

In some embodiments, each rounding mode is associated with a certain (single) rounding bit sequence that is then applied to each and every one of the data elements in the block of data elements (although potentially at different bit positions, as will be explained further below).

However, it is also contemplated that a given rounding mode may be associated with a plurality of rounding bit sequences that may, e.g., be applied to different data elements in the block of data elements, as desired, and in some embodiments this is the case. In that case, which rounding bit sequence is applied for a particular data element when using the associated rounding mode may be selected based on any suitable criterion, as desired.

For example, a simple criterion may be that the rounding bit sequence that is applied for a particular data element is selected based on how many most significant bits are used to represent the truncated data value for the data element (such that different rounding bit sequences may be applied for different data elements within a block in dependence on how many most significant bits are stored for the different data elements).

The criterion for deciding which rounding bit sequence to apply to which data elements may be more or less sophisticated, as desired. For instance, in some cases, the rounding bit sequences associated with a particular rounding mode may be indexed according to the data elements such that when that rounding mode is selected the rounding bit sequence that is to be applied to a data element can be determined from the index (and such that a particular rounding mode could potentially apply different rounding bit sequences to each data element).

In general therefore each rounding mode may be associated with one or more rounding bit sequence(s). Further, for a set of plural available rounding modes, some of the rounding modes may be associated with a single rounding bit sequence and some of the rounding modes may be associated with plural rounding bit sequences.

Various arrangements would be possible in this regard.

Each of the available rounding modes may thus be associated with one or more predetermined sequence(s) of four, six, etc., bits (one or more rounding bit sequences) to be added to the truncated data values for the data elements to obtain decoded data values.

The rounding bit sequence(s) may be added to the truncated data values (when determining the representative values, and when decoding the data packet using the selected rounding mode) in any suitable fashion.

In an embodiment, the rounding bit sequence for a data element is added immediately after the most significant bits stored for the truncated data value for the data element. This means that even where the rounding bit sequence that is to be added to the truncated data values for different (e.g. for all of the) data elements in a block is the same (as is the case in some embodiments), the rounding bit sequence may be added at different bit positions, e.g. depending on how many most significant bits are used to represent the truncated data value for a data element. Thus, although in embodiments the same rounding bit sequence is applied for all of the data elements in the block, the actual rounding values that are added may be different for different data elements.

However, other arrangements would of course be possible. For instance, where the data values are represented in 8-bit form, and it is expected that only one or two most significant bits are stored for each data element, the respective rounding bit sequence may be added to the truncated data value for a (and, e.g., each) data element in place of the third, fourth, etc. most significant bits, i.e. at the same bit positions regardless of whether one or two most significant bits are stored for the data element. In that case, the same rounding value may be added for each of the data elements (i.e. the same rounding bit sequence at the same bit positions). In other examples, rather than adding the rounding bit sequence(s) after the most significant transmitted bits, the rounding bit sequence(s) may be added in place of the least significant bits.

In an embodiment a comparison is made between the first representative value and corresponding representative values obtained for each of the available rounding modes. However, this need not always be the case. For instance, if the first tested available rounding mode gives an exact match to the original data, there may then be no need to check the other available rounding modes (and so in embodiments this may not be done).

Further, one of the available rounding modes may comprise a 'zero' mode, i.e. wherein the rounding bit sequence that is added is '0' (or, alternatively, where no rounding bit sequence is added). In that case the representative value may be calculated for the zero mode based (solely) on the truncated data values, and then compared to the other available rounding modes.

Whilst embodiments have been described above in relation to a single block of data elements, it will be appreciated that a rounding mode is in an embodiment selected for each block of data elements in the overall array of data elements. Different rounding modes can thus be (and in an embodiment are) selected for different blocks of data elements in the overall array of data elements as appropriate in order to provide an improved reconstruction of the original data values for each block. However, in principle only a subset of, i.e. less than all of, the blocks may be processed in this way.

This approach has been found to give a better representation of the original data values in the decoded output, e.g. with improved granularity from block to block, e.g. which may be from block to block across the array of data elements (e.g. across a single image), or from block to block in a sequence of data arrays (e.g. an image sequence).

For instance, in some cases, it can be expected that the data elements within a single block will generally have similar data values (although this need not be the case). For example, this may be the case where the block represents a portion of an image and wherein the data values are brightness (luma) values, as the brightness across a certain portion of the image (i.e. a block) may be substantially constant. Applying a suitable rounding mode at the block level can therefore work well to provide a finer control over the block to block granularity and a better reproduction of the original data values.

Correspondingly, the size of the blocks may be tailored to ensure that this is the case. That is, in embodiments, the size of the block of data elements may be selected such that all of the data elements within the block of data elements (are expected to) have similar data values, e.g. falling within a certain range. The technology described herein thus attempts to mitigate the problems described above and may thus allow for a better reproduction of the original data array, e.g. by providing a better reproduction of the apparent brightness levels of the blocks within the overall data array, even when the bit sequence representations of the data values have been aggressively truncated during the encoding of the block of data elements (such that the least significant bits are not included into the data packet).

The selected rounding mode for a block may then be indicated to the decoder in any suitable fashion, e.g. using sideband information, if desired.

However, in an embodiment the rounding mode that is to be used for a block is signalled in the data packet, in an embodiment in a suitable header for the data packet. The decoder is thus able to read this information from the header when processing the data packet, and apply the appropriate rounding mode when decoding the block.

The improved granularity according to the technology described herein is achieved by the selection of the (most) appropriate rounding mode from a plurality of available rounding modes. A greater number of available rounding modes can thus provide a further increase in granularity. However, there may then be a trade-off between the increase in granularity and the cost for calculating the representative values for the available rounding modes, as well as increased data storage requirements for signalling the selected rounding mode for the data packet.

Further, when the rounding mode is signalled in the data packet itself (e.g. in a header), increasing the number of rounding modes above a certain point may be more to the detriment of the overall quality of the decoded output since this would mean that fewer bits were transmitted for the data elements.

In view of this, there are in an embodiment only a limited number of available rounding modes, such as two, four, eight, or sixteen rounding modes. This has been found to provide an improved data fidelity whilst still allowing the rounding mode to be signalled relatively cheaply. Further, because the rounding mode is applied, and signalled, at the block level the rounding mode can be signalled in a convenient fashion (i.e. since this is the level at which the data elements are encoded/decoded).

For example, in one embodiment, there may be four available rounding modes. In that case, the selected rounding mode can then be signalled using two bits (only). In principle the rounding bit sequence that is to be used for a block could be encoded directly. For instance, in some embodiments, the selected rounding mode is associated with a certain sequence of bits that is to be added to (each of) the truncated data values for the data elements in the encoded block. In that case, the bits used to signal the rounding mode may directly reflect the rounding bit sequence that is to be added. However, in an embodiment it is the rounding mode that is signalled (rather than attempting to signal the rounding bit sequence itself), which then allows any rounding mode (associated with any desired rounding bit sequence(s)) to be signalled accordingly. For instance, four available rounding modes may be represented using the four pairs of bits '00', '01', '10' and '11' with each pair of bits representing a different rounding mode associated with a different set of one or more predetermined rounding bit sequence(s). In general, there may be any suitable association that allows the rounding bit sequence(s) associated with a particular rounding mode to be identified. For example, in embodiments the rounding bit sequence(s) associated with a particular rounding mode may be obtained from a suitable, e.g., look-up table. However, various other arrangements would be possible in this regard.

Thus, it is possible to signal any four rounding modes (rounding bit sequences) using only two bits. In the illustrative example given above, this means that there would then still be 126 bits available for the sample data (and/or any additional information that might desirably be added into the data packet, such as a bit sequence indicating the encoding mode, etc.). This means that for some of the samples only the single most significant bit would be sent (with the two most significant bits being sent for the other samples). However, this may be still acceptable and the loss of information can be compensated at least in part by the use of the (most) appropriate rounding mode.

Similarly, using three bits, it is then possible to signal eight different rounding modes, and so on. As discussed above there is a trade-off between increasing the number of bits that are required to signal the rounding modes and leaving bits free for encoding as many most significant bits as possible for the data elements.

Thus, the technology described herein may allow for improved data fidelity, and in particular allows an improved block-to-block granularity in the reconstructed data, even in the case where the bit sequence representations of the data values for the data elements within a block of data elements are very aggressively truncated during the encoding of the block of data elements. Further this can be achieved with little additional data storage and/or data transmission overhead.

In embodiments, as described above, the technology described herein takes an appropriate block of data elements (such as an N×N block), which will have a given size in its raw form, and encodes that block in a data packet of the desired size e.g. to meet the required compression rate. This is in an embodiment then repeated for other blocks of data elements in the overall array of data elements to generate an encoded data stream comprising a plurality of (independently) encoded data packets representing the various blocks into which the overall array of data elements has been divided.

Embodiments of the technology described herein are thus capable of compressing a given data array into a stream of data packets each having a fixed size. For instance, the technology described herein may compress to a fixed (selected) bit rate, such as to one half, or one third, of the original size. For example, a block that is 64 bytes in its raw form may be compressed, for example, to a fixed rate of 32 bytes per block (half rate compression). Similarly, a raw block having 96 bytes (which might be the case, for example, for an 8×8 YUV420 block), may be compressed to 48 bytes (half rate) or 32 bytes (one third rate).

The "raw" encoding scheme described above may be particularly appropriate when the array of data elements represents highly complex or random data. However, it will be appreciated that various other more sophisticated encoding schemes also exist that may be more appropriate for certain other types of data. For example, such schemes may utilise an expected behaviour in the data to provide a more efficient encoding (but which schemes may therefore be less efficient when the data does not match the expected behaviour). For instance, for natural image data that has been transformed into the frequency domain, there may then be expected to be leading sequence of '0's, which could be efficiently encoded.

That is, the Applicants have also recognised that the "raw" encoding arrangement of the technology described herein may not be so appropriate for particular forms of input data. Thus, the encoder can in embodiments recognise instances when using the particular encoding scheme described according to the technology described herein may be less suitable, and in that case in an embodiment encode the input data in a different way, and indicates to the decoder that that is what has been done.

Thus, the encoder may be able to select between a plurality of different available encoding schemes based on the input data. The encoder may select an encoding scheme based on the input data in various suitable ways, e.g. based on a suitable metric. For example, in embodiments, the encoder may perform a frequency transform operation on the array of data elements, and then select an encoding scheme based on a suitable metric such as a sum of the absolute values of the transformed coefficients, or similar. However, various other arrangements would of course be possible.

For instance, when the data is image data, it may in some cases be more efficient to encode this by first performing a frequency domain transform, and then performing bit plane coding of the frequency domain coefficients. Whether or not this is more efficient than simply encoding the raw data values will generally depend on the complexity of the image data. A check can thus be performed, e.g. by summing the data values (in the frequency domain), to determine which encoding scheme is likely to give the best result, and that encoding scheme can then be selected.

The raw encoding scheme described above may therefore in some embodiments be used in conjunction with another encoding scheme. The encoder (circuit) may thus analyse the array of data elements and determine which encoding scheme (from a plurality of available encoding schemes) is to be used. For instance, the determination of which encoding scheme is to be used may be performed in an initial step, up-front of the encoding. Alternatively, in some embodiments, the determination of which encoding scheme is to be used may be performed in parallel with applying a plurality of different available encoding schemes, with the encoding scheme that is to be used then being selected at the end. This may help reduce input latency. Various arrangements would be possible in this regard.

Thus, in embodiments, the encoder is able to select between two (or more) encoding schemes. This may also be signalled for (and in an embodiment in) the data packet. For example, the header may also indicate which encoding scheme is being used.

In any of the embodiments described herein the array(s) of data elements may take any desired and suitable form. Thus, although an example has been given above in the context of grayscale image data, it will be appreciated that the technology described herein is not limited to such data and can generally be used when processing any suitable image or non-image data, as desired. Thus, whilst embodiments relate to data array(s) including image and/or video data, other examples of data array arrangements would be possible if desired and in general the array(s) of data elements may comprise any data array that can suitably or desirably be encoded according to the technology described herein.

The array(s) of data elements in an embodiment represent a spatial distribution of values. That is, the array(s) of data elements represents a set of data values that are distributed in the spatial domain. So, each data element may represent a data value at a certain position within the spatial distribution. Thus, in embodiments, the array(s) of data elements may (each) correspond to an array of data positions.

In embodiments, the array(s) of data elements or positions may correspond to all or part of a desired (e.g. image) output, such as a still image or a video frame (e.g. for display). That is, the array(s) of data elements in an embodiment comprise array(s) of image data, i.e. data that may be used to generate an image for display. Thus, an array of data may in embodiments correspond to a single still image that is to be encoded. In other embodiments an array of data may correspond to a video frame of a stream of video frames that are to be encoded.

In some embodiments the array(s) of data elements comprise array(s) of grayscale image data. In particular, the data values may represent luma values. However, it will be understood that the data need not comprise grayscale image data and that the technology described herein is equally applicable to colour (e.g. RGBA) image data. In that case the approach described above may either be used separately for each channel (RGBA), or for the channels collectively, e.g. by determining a suitably representative "common" value for the data values across all the colour channels.

In general, there may be any desired and suitable correspondence between the data elements and the desired output. For example, the data elements in the block may each correspond to a pixel or pixels of a desired output. The block of data elements can be any desired and suitable size or shape in terms of data elements or positions, but is in an embodiment rectangular (including square). The data elements may represent two-dimensional data, but could also represent one-dimensional, three-dimensional, or higher-dimensional data. The data elements may also have any desired and suitable format, for example that represents image data values (e.g. luma or colour values).

In any of the embodiments described herein, the array(s) of data elements may be provided in any desired and suitable way. Embodiments may comprise generating (at least some or all of) the data elements of the array(s). Embodiments may also or instead comprise reading in (at least some or all of) the data elements of the array(s), e.g. from memory.

The data elements of the array(s) may be generated in any desired and suitable way. In embodiments, the data elements of the arrays may be generated by a camera such as a video camera. In other embodiments, generating the data elements of the arrays may comprise a rendering process. The rendering process may comprise deriving the data values represented by the data elements of the arrays (e.g. by rasterising primitives to generate graphics fragments and/or by rendering graphics fragments). A graphics processor (a graphics processing pipeline) may be used in order to generate the data elements of the arrays. The graphics processing pipeline may contain any suitable and desired processing stages that a graphics pipeline and processor may contain, such as a vertex shader, a rasterisation stage (a rasteriser), a rendering stage (a renderer), etc., in order to generate the data elements of the arrays.

In the technology described herein the data elements of the data array(s) are encoded as "blocks" of data elements, e.g. on a block by block basis. For instance, the array(s) of data elements may be divided into plural source blocks to be encoded on a block by block basis. Thus, any reference herein to processing or encoding a data array or data elements of a data array should be considered to include, and typically involves, processing or encoding such blocks of data elements. A "block" may generally comprise an N×N array of data elements.

Thus, when encoding an (overall) array of data elements, e.g. representing an entire frame (image), the (overall) array of data elements is divided into a plurality of blocks, and each block is then encoded according to the encoding scheme of the technology described herein to provide a corresponding set of data packets. In the embodiments, each block of data elements within the larger array of data elements is encoded (compressed) into a fixed size data packet. Thus, in an embodiment, the block of data elements that is being encoded into a fixed size data packet comprises a block of data elements from a larger, overall, data array (and this is in an embodiment repeated for each of the plural blocks making up the overall data array). The data packets for each of the blocks can then be suitably combined, in a certain order, into an encoded data stream representing the overall array of data elements.

Thus, the technology described herein is a block-based scheme, with each block in an embodiment being independently encoded, such that blocks can then be independently decoded. This may facilitate random access to blocks within frames that have been encoded using the technology described herein. For instance, it will generally be known how many bytes there are per data packet (block), and the location of individual blocks within memory can therefore easily be identified, such that they are easy to load and to random access.

The data elements may comprise difference values, e.g., compared to a reference frame or block. However, more often, the encoding scheme is used for encoding raw data, and the data elements may therefore represent (raw) pixel values.

The technology described herein also extends to processes of encoding arrays of data elements per se, and to an encoder (circuit) for performing such methods.

Another embodiment of the technology described herein comprises a method of encoding an array of data elements, each data element having an associated data value that is represented by a respective bit sequence, the method comprising:

for a block of data elements in the array of data elements:
representing the data values for each of the data elements in the block of data elements as truncated data values using a subset of one or more most significant bits of the respective bit sequences for the data values of the data elements; and
selecting from a plurality of available rounding modes a rounding mode to be applied when decoding the block of data elements, wherein each rounding mode is associated with one or more rounding bit sequence(s), and wherein the rounding mode to be applied when decoding the block of data elements is selected by:
determining a first representative value for the block of data elements based on data values for data elements in the block of data elements;
determining a corresponding representative value for the block of data elements for at least one of the plurality of available rounding modes, wherein the representative value for a rounding mode is determined based on truncated data values for data elements in the block of data elements and the respective rounding bit sequence(s) associated with the rounding mode;
comparing the first representative value for the block of data elements determined based on the data values to the corresponding representative value determined for the at least one of the plurality of available rounding modes to determine which of the plurality of available rounding modes gives a representative value that is closest to the first representative value; and
selecting the rounding mode to be applied when decoding the block of data elements based on which of the plurality of available rounding modes is determined to give a representative value that is closest to the first representative value that was determined for the block of data elements;
the method further comprising:
encoding the block of data elements by storing the truncated data values for the data elements as a data packet representing the block of data elements and providing for the data packet data indicative of the rounding mode that is to be used when decoding the data packet.

A further embodiment of the technology described herein comprises an encoder for encoding an array of data elements, each data element having an associated data value that is represented by a respective bit sequence, the encoder comprising:

an encoding circuit that is configured to:
for a block of data elements in the array of data elements:
represent the data values for each of the data elements in the block of data elements as truncated data values using a subset of one or more most significant bits of the respective bit sequences for the data values of the data elements; and
select from a plurality of available rounding modes a rounding mode to be applied when decoding the block of data elements, each rounding mode being associated with one or more rounding bit sequence(s), wherein the selection of the rounding mode is performed by a rounding mode selection circuit that is configured to:
determine a first representative value for the block of data elements based on data values for data elements in the block of data elements;
determine a corresponding representative value for the block of data elements for at least one of the plurality of available rounding modes, wherein the representative value for a rounding mode is determined based on truncated data values for the data elements in the block of data elements and the respective rounding bit sequence(s) associated with the rounding mode;
compare the first representative value determined for the block of data elements to the corresponding representative value determined for the at least one of the plurality of available rounding modes to determine which of the plurality of available rounding modes gives a representative value that is closest to the first representative value; and
select the rounding mode to be applied when decoding the block of data elements based on which of the plurality of available rounding modes is determined to give a representative value that is closest to the first representative value that was determined for the block of data elements;
the encoding circuit being further configured to:
encode the block of data elements by storing the truncated data values for the data elements as a data packet representing the block of data elements and providing for the data packet data indicative of the rounding mode that is to be used when decoding the data packet.

The encoder (encoding circuit) and method of encoding according to these further embodiments may comprise any of the features described above in relation to the other embodiments of the technology described herein.

The encoding of the technology described herein thus generates a data stream that in an embodiment comprises a sequence of fixed size data packets (e.g. each representing an array (or block) of data elements). The encoded data stream generated by the encoder may be output to a memory for storage (e.g. for subsequent decoding and/or transmission) or may be output to an external device (e.g. for subsequent decoding and optionally display).

When it is desired to subsequently access or use the data that has been encoded into the data packet, the data packet is then passed to a decoder (circuit), and can be decoded thereby.

The decoder (circuit) may thus first analyse the data packet, e.g. by reading the header thereof, to determine whether the data packet has been encoded in the manner above, and whether a rounding mode has been selected.

Once the decoder (circuit) has identified the rounding mode to be used for the data packet, the decoder (circuit) extracts the truncated data values for each of the data elements in the encoded block, and then adds the rounding bit sequence(s) associated with the indicated rounding mode to the data elements to generate the decoded output.

The technology described herein also extends to corresponding methods and apparatuses for decoding data that has been encoded in the manner of the technology described herein.

Another embodiment of the technology described herein comprises a method of decoding a data stream comprising one or more data packet(s), each data packet encoding a block of data elements within an array of data elements, wherein each data element in the block has an associated encoded data value, and wherein data indicative of a rounding mode that is to be used when decoding the data packet is provided for the data packet, the rounding mode being associated with one or more rounding bit sequence(s), the method comprising:

when it is desired to use the data value(s) for one or more of the data element(s) in a block of data elements that has been encoded into a data packet:

reading the data packet to extract the encoded data value(s) for the one or more data element(s) in the block of data elements;

identifying the rounding mode that is to be used when decoding the data packet; and adding the rounding bit sequence(s) associated with the identified rounding mode to the encoded data value(s) to obtain decoded data value(s) for the one or more data element(s) in the block of data elements.

A further embodiment of the technology described herein comprises a decoder for decoding a data stream comprising one or more data packet(s), each data packet encoding a block of data elements within an array of data elements, wherein each data element in the block has an associated encoded data value, and wherein data indicative of a rounding mode that is to be used when decoding the data packet is provided for the data packet, the rounding mode being associated with one or more rounding bit sequence(s), the decoder comprising a decoding circuit configured to:

when it is desired to use the data value(s) for one or more of the data element(s) in a block of data elements that has been encoded into a data packet:

read the data packet to extract the encoded data value(s) for the one or more data element(s) in the block of data elements;

identify the rounding mode that is to be used when decoding the data packet; and add the rounding bit sequence(s) associated with the identified rounding mode to the encoded data value(s) to obtain decoded data value(s) for the one or more data element(s) in the block of data elements.

In general, the decoder is operable to decode the data packets to recover a (lossy) representation of the original source data (e.g. image) that was encoded, and then use (e.g. display) this data as desired. Thus, once a data packet has been decoded, the decoder may then be configured to display, or output for display, data obtained using the decoded data packet.

The encoding and decoding apparatuses discussed above may generally be provided as part of a data processing system. For example, the apparatuses may comprise part of an image and/or video processing system that includes a camera, such as a digital camera, mobile phone or tablet.

In general, the processes described herein in any embodiment may be performed by any desired and suitable apparatus. For example, the processes described herein in any embodiment may be performed by an image or video processor (codec). The data processing apparatus described herein in any embodiment may therefore comprise or may be a video processor. Thus, the processing (encoding/decoding) circuitry, output circuitry, header generating circuitry, header reading circuitry or input circuitry, etc. described herein in any embodiment may form part of a video processor. The data processing apparatus described herein in any embodiment may comprise, or may be, or may form part of, a system on chip (SoC).

As will be appreciated by those skilled in the art, the encoding/decoding apparatus of the technology described herein may be part of an overall data processing system that includes, for example, a host (e.g. central) processor. The host processor may, for example, execute applications that require data processing by the encoding/decoding apparatus. The host processor may send appropriate commands and data to the encoding/decoding apparatus to control it to perform the data encoding/decoding operations and to generate and/or use an output required by applications executing on the host processor. To facilitate this, the host processor may execute a driver for the encoding/decoding apparatus.

In embodiments, the apparatus or system may comprise, and/or may be in communication with, one or more memories and/or memory devices that store the data described herein, and/or store software for performing the processes described herein. The apparatus or system may comprise, and/or may be in communication with a display for displaying images based on the data elements of the arrays. The apparatus or system may comprise, and/or may be in communication with a camera that generates the arrays of data elements.

The memory referred to herein may be any desired and suitable memory of or for the data processing apparatus. The memory may be external to the data processing apparatus, e.g. video processor and/or system on chip (SoC). The memory may be, for example, main system memory.

The technology described herein can be used for all forms of data arrays that a data processing apparatus may provide and/or use, such as images or frames for display. Thus, as indicated above, the arrays of data elements may comprise image data and/or may correspond to images or frames of image data.

In an embodiment, the various functions of the technology described herein are carried out on a single data (e.g. image) processing platform that provides and/or uses the arrays of data elements.

The technology described herein can be implemented in any suitable system, such as a suitably configured computer or micro-processor based system. In an embodiment, the technology described herein is implemented in a computer and/or micro-processor based system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, and stages of the technology described herein may comprise a suitable processor or processors, controller or controllers, functional units, circuits, circuitry, processing logic, microprocessor arrangements, etc., that are operable to perform the various steps or functions, etc., such as appropriately dedicated hardware elements (processing circuits/circuitry) and/or programmable hardware elements (processing circuits/circuitry) that can be programmed to operate in the desired manner.

In particular, it is contemplated that the encoder may be implemented either in hardware or software, as desired. Thus, for example, the encoder may comprise a suitable processor or processors, controller or controllers, functional units, (encoding) circuits/circuitry, processing logic, microprocessor arrangements, etc., that are operable to perform the various encoding steps or functions, etc., as described herein such as appropriately dedicated hardware elements (processing circuits/circuitry) and/or programmable hardware elements (processing circuits/circuitry) that can be programmed to operate in the desired manner.

Similarly, the decoder can be implemented in hardware or software, as desired. Thus, for example, the decoder may comprise a suitable processor or processors, controller or controllers, functional units, (decoding) circuits/circuitry, processing logic, microprocessor arrangements, etc., that are operable to perform the various encoding steps or functions, etc., as described herein such as appropriately dedicated hardware elements (processing circuits/circuitry) and/or programmable hardware elements (processing circuits/circuitry) that can be programmed to operate in the desired manner.

The various steps or functions, etc., of the technology described herein may be duplicated and/or carried out in parallel on a given processor. Equally, the various processing stages may share processing circuits/circuitry, etc., if desired.

Subject to any hardware necessary to carry out the specific steps or functions, etc., discussed above, the system can otherwise include any one or more or all of the usual functional units, etc., that data processing apparatus and/or systems include.

The various data processing stages can accordingly be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus or system comprising a data processor causes in conjunction with said data processor said apparatus or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology described herein, present or future, including but not limited to, semiconductor, magnetic, or optical, or transmitted using any communications technology described herein, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

Various embodiments will now be described in more detail by way of example only and with reference to the accompanying drawings.

As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings (or, conversely, where elements are shown as sharing significant hardware circuits, these may in practice comprise separate elements).

FIG. 1 shows schematically an embodiment of a data processing system 100 that can provide and use data arrays, such as images or video frames for display, that have been encoded in the manner of the technology described herein. It will be appreciated that FIG. 1 merely shows one example of a system that is suitable for use with the technology described herein, and that various other arrangements are possible.

In this embodiment, the system 100 comprises a data processing apparatus in the form of a system on chip (SoC) 102. The system 100 also comprises off-chip (main) memory 116, a display device 118 and a video camera 120.

The SoC 102 comprises a central processing unit (CPU) 104, a graphics processing unit (GPU) 106, an image/video processor 108, a display controller 110, an interconnect 112 and a memory controller 114.

As is shown in FIG. 1, the CPU 104, GPU 106, image/video processor 108, and display controller 110 communicate with each other via the interconnect 112 and with the memory 116 via the interconnect 112 and memory controller 114. The display controller 110 also communicates with the display device 118. The video camera 120 also communicates with the SoC 102 via the interconnect 112.

In embodiments, the image/video processor 108 reads in image data from memory 116, encodes the image data (e.g. in the manner of the technology described herein) using a suitable encoder circuit 122, and then outputs that encoded image data, e.g. for storage in memory 116 or for streaming to another device. The encoded image data can later be retrieved and decoded, e.g. by a suitable decoder circuit 124 of the image/video processor 108, or received and decoded by another device. Although the image/video processor 108 is shown as having a separate encoder circuit 122 and decoder circuit 124 it will be appreciated that this is merely schematic and that these may form part of a common encoding/decoding circuit. The decoded image data can then be output, e.g. by the display controller 110 to the display device 118 or by another device, for display.

Thus, within such data processing systems it may be desired at various points to be able to compress the image data that is being processed. Furthermore, in order to be able to facilitate higher throughput, e.g. for higher bandwidth media applications, it may be desirable to be able to guarantee a given bandwidth (bit rate).

In the present embodiment an encoding scheme that is capable of encoding the image data into a data packet having a fixed size, and thus guaranteeing a desired bit rate, is used. The encoding scheme is a block-based scheme. When encoding a block of image data, at least some of the image data is encoded using a 'raw' encoding scheme wherein the most significant bits representing the data values (e.g. luma values) for the different sampling points within the image are added into the data packet 'as is' until the data packet is full.

This 'raw' encoding scheme thus adds as many most significant bits as possible for the data elements until the desired size is reached. However, depending on the desired size of the data packet, this may have the effect that the data values are heavily truncated. For instance, in a typical example, it may be the case that only the one or two most significant bits for each of the sampling points are added into the data packet, with all of the other less significant bits being discarded.

This can lead to artefacts in the reconstructed image data. For example, when the data values represent luma values, there may then be relatively coarse steps in brightness across the image, or between different images in an image sequence.

The present embodiment attempts to mitigate this and to provide an improved granularity between blocks by selecting a suitable rounding modifier value that can be applied on a per block basis to give a better reproduction of the original data values for the blocks.

Figure 2:
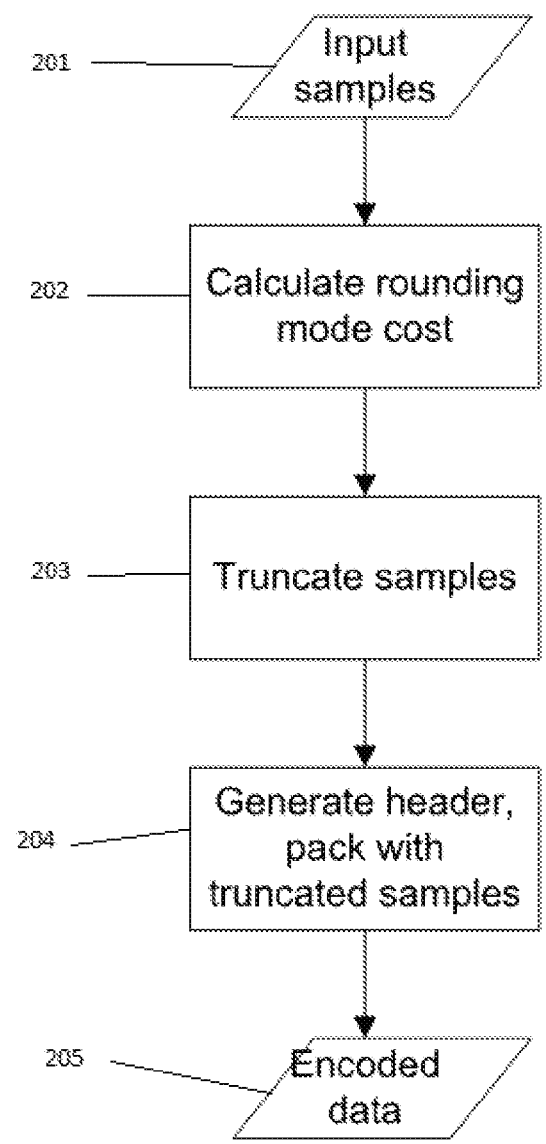
FIG. 2 is a flowchart schematically illustrating an encoding scheme according to an embodiment.

FIG. 2 is a flowchart illustrating the encoding process for encoding a block of data elements according to the present embodiment.

As shown, the process starts with a set of input samples for the block (step 201). The encoding of the technology described herein may, as above, store only a subset of the most significant bits for the data elements. The original data values are thus truncated (step 203) and it is only these truncated data values that are stored for the data elements in the data packet (step 204). The less significant bits that are not to be stored in the data packet are thus discarded at this stage.

However, before the less significant bits are discarded, they are used to determine a rounding mode that is to be used for the block of data elements (step 202). A rounding mode cost can thus be calculated for the block as follows. Firstly a representative value for the block of data elements is determined. This may, for instance, comprise a sum of the data values (although any other suitably representative value may be used).

Corresponding representative values for the block of data elements are then determined for each of the available rounding modes. This is done by calculating a representative value in the same way as the first representative value for the block of data elements but, rather than using the original data values, using modified data values obtained by adding a respective rounding bit sequence for the rounding mode to the truncated data values.

The first representative value determined from the original data values is then compared with the representative values obtained for each of the available rounding modes in order to determine which rounding mode gives the best reproduction of the original data.

The encoded data packet can then be generated including a suitable header identifying the rounding mode that is to be used for the block and the truncated values for the data elements in the block (step 204). The encoded data packet can then be provided for output (step 205), e.g. and subsequently decoded.

Figure 3:
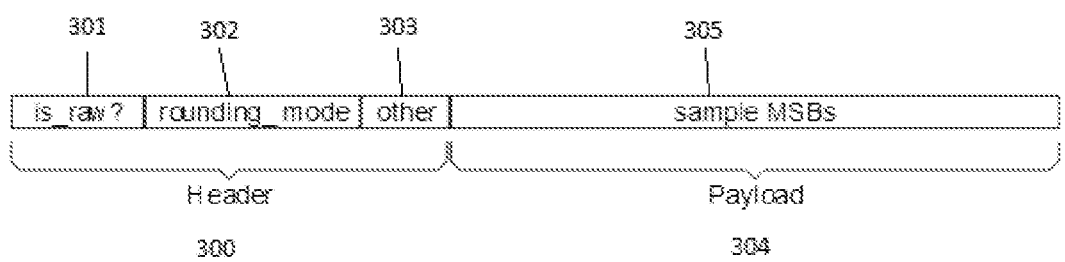
FIG. 3 shows schematically an example of a compressed data packet generated according to an embodiment.

FIG. 3 shows an example of an encoded data packet generated according to the present embodiment. In particular, as shown in FIG. 3, the data packet includes a header that specifies the selected rounding mode, for example using a 'rounding_mode' field 302. For example, there may be four available rounding modes, which can thus be specified using two bits. (However, in general there may be greater or fewer available rounding modes.) The most significant bits for the encoded data elements are then stored in the pack in a particular order, for example in a sample MSBs field 305.

The header may also include any other suitable information, as desired. For example, when the encoder is able to select between different encoding modes, the encoding mode may be indicated at the start of the header using a suitable data structure (e.g. when the 'raw' encoding scheme described above is used, this may be signalled using fours bits as '0000', for example, using an 'is_raw' field 301, although of course any other suitable signalling may be used).

The header may also indicate the nature of the data, for example, whether the data represents grayscale or colour (RGBA) data, for example using an 'other' field 303.

Figure 4:
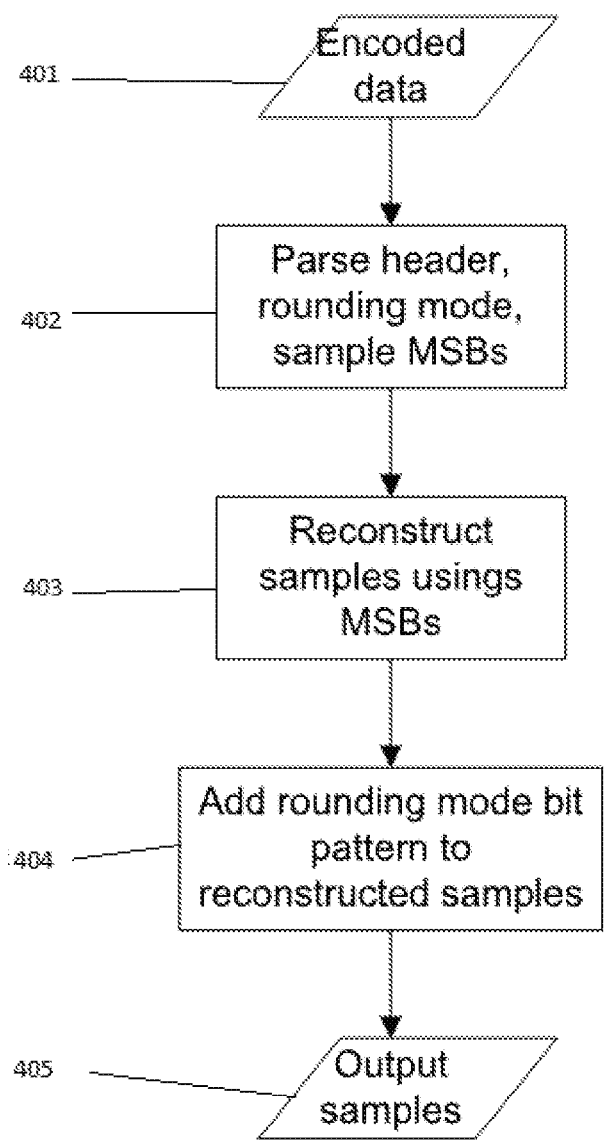
FIG. 4 is a flowchart schematically illustrating a decoding scheme according to an embodiment.

FIG. 4 then illustrates a corresponding decoding process. The decoder receives an encoded data packet of the type shown in FIG. 3 (step 401). The decoder is then able to read the header to confirm the rounding mode that should be used (and optionally also to confirm the encoding scheme, and so on) and to then extract the most significant bits for the encoded data elements (step 402). The data elements (samples) can then be reconstructed using their most significant bits (step 403), and the indicated rounding mode bit pattern is then added accordingly (step 404) to give the output samples (step 405).

Figure 5:
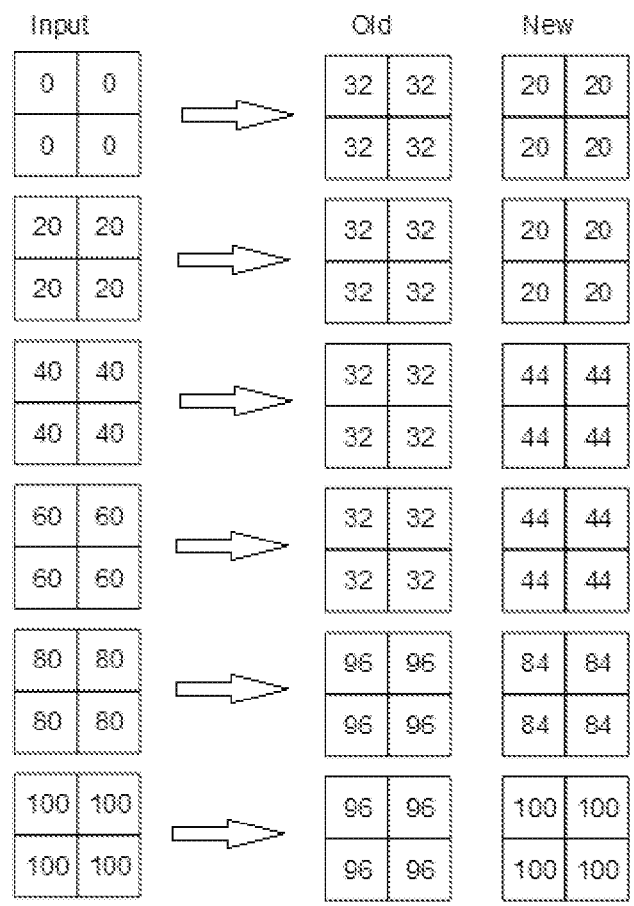
FIG. 5 shows a comparison between an embodiment and an encoding scheme without using the technology described herein.

An example will now be described with reference to FIG. 5. In particular, FIG. 5 shows a set of input blocks each comprising four samples having associated 8-bit data values. In particular, FIG. 5 represents an example of a brightness fading wherein the input block is being faded gradually from 0 to 100 in steps of 20.

One approach for encoding this data would be to transmit the top two most significant bits (only), and then round the encoded values by setting the bit value for the bit below the least valued transmitted bit to '1', and the remaining least significant bits to '0'. It will be appreciated that each bit value in the bit sequence contributes half the value of the (higher) bit value that precedes it. This approach therefore has the effect of indiscriminately rounding the encoded data values up by a certain amount.

So, for the example shown in FIG. 5, for the first input block, with a value of '0' (00000000), the first two bits (only) are transmitted (00xxxxxx) and this rounding scheme would then give an output value of '32' (00100000). The same output value of '32' would also be given for the second, third and fourth input blocks, with respective input values of '20', '40' and '60' as in each case the top two (transmitted) bit values are '0'. Indeed, it is only when one of the top two most significant bits changes, e.g. for the fifth input block having an input value of '80' (01010000), that the output will change, when the output will jump to '96' when applying the above rounding scheme.

Thus, using this approach, the desired smooth fading effect is lost and there is only a single large step in the data values moving along the sequence of blocks.

The present embodiments allow a finer grained control over the available output values and can therefore reproduce smoother variations. For instance, in the present example four rounding modes are available, each being associated with a single respective rounding bit sequences as follows:

| Rounding Mode | Rounding Bit Sequence |
|---|---|
| 00 | 0101 |
| 01 | 0111 |
| 10 | 1001 |
| 11 | 1011 |

Thus, the selection of the rounding mode to be used for a block from the four available rounding modes, which in this example each include a sequence of four bits to be added immediately after the top two transmitted bits (e.g. where two MSBs are transmitted, the rounding bit sequence can be added in the next four bit positions, as: 00xxxxxx), can be signalled using two bits. Of course, any suitable set of rounding modes may be used and each of the rounding modes may be associated with any suitable set of one or more rounding bit sequence(s).

Similarly, although in this case four rounding modes are used (because this offers a good balance between allowing for a finer granularity in the output data without using too many bits specifying the rounding mode), in principle any number of rounding modes may be used as desired. For instance, in the simplest case, two rounding modes may be used, which can therefore be specified using only one bit. Alternatively, a greater number of rounding modes (e.g. eight, sixteen, etc.) may be used to provide even finer granularity, but with associated bit and encoding costs.

When applying the rounding scheme of the present embodiment, it is determined for each block of data elements which of the rounding modes will give the best reproduction of the original data value, and this rounding mode is then applied at the decoder when generating the decoded data values.

For example, for the first input block, with a data value of '0', the smallest rounding modifier is selected (i.e. mode '00') as most closely representing the original value and the output is therefore '20' (000101000), with the two transmitted bits (00xxxxxx) being modified by adding the modifier 0.0101.

For the second input block, having a data value of '20', the same rounding modifier is used again to give an output value of '20'.

For the third input having data values of '40' it is found that the fourth mode ('11') gives the best representation of the data as the two transmitted bits (00xxxxxx) are modified using the modifier 0.1011 to give a value of '44' (00101100).

Similarly the fourth input having data values of '60' is output as '44', the fifth input having data values of '80' is output as '84' and the final input block in the sequence is output as '100'.

Thus, it can be seen that the outputs obtained using the present embodiments better match the original data values in the input sequence, and allow for a smoother variation in the decoded data values to be represented.

In the example of FIG. 5, for ease of illustration, all of the samples within each input block have the same data (brightness) value. However, this need not be (and typically will not be) the case and there may therefore typically be some variation in brightness across the block. Nonetheless, it will be appreciated that a given block represents only a portion of the overall image, and it may be expected that adjacent samples in a single block may have similar (if not the same) brightness levels. Correspondingly, the size of the blocks may be tailored such that this is the case, e.g. such that all of the samples within the block have similar luma values. Applying a rounding modifier at the block level can therefore work well to improve the decoded output as it is generally possible to calculate a "common" representative value for the block, which can be thought of as being representative of an 'average' of the data values within the block.

In general therefore the algorithm to choose rounding mode selects the best rounding mode by calculating a reference brightness representative of the brightness of the original data array and a corresponding brightness for each of the rounding modes, as below. The rounding mode with a brightness closest to the reference is then selected.

reference_brightness=sum(pow(sample[$i$],2))

$rm0$_brightness=sum(pow(truncate(sample[$i$])+$rm0$[$i$], 2))

$rm1$_brightness=sum(pow(truncate(sample[$i$])+$rm1$[$i$], 2))

$rm2$_brightness=sum(pow(truncate(sample[$i$])+$rm2$[$i$], 2))

$rm3$_brightness=sum(pow(truncate(sample[$i$])+$rm3$[$i$], 2))

It will be appreciated that even though the same rounding bit sequence is added for each of the samples, the rounding bit sequence may be added at different bit positions for different samples, e.g. depending on how many most significant bits are stored when truncating the sample. Thus, in the equations above, the rounding bit sequences for each of the rounding modes are also indexed according to the sample.

Also, it will appreciated that the reference brightness need not be calculated using all of the sample points but could instead by determined using only a, e.g. random, subset of these. Various other arrangements would of course be possible.

It will also be noted that in this example the reference brightness is calculated from a sum of the squared luma values for each sample. This is because the brightness does not increase in a linear fashion (e.g.) from 0 (black) to 256 (white) (but instead is described by a gamma curve, involving the power 2.2). Thus, it has been found that using a sum of squares gives a better reference value for the brightness.

However, if less precision was acceptable, the brightness relationship could be approximated using a direct sum of the data values, e.g. by determining representative brightness values as follows:

reference_brightness=sum(sample[$i$])

$rm0$_brightness=sum((truncate(sample[$i$])+$rm0$[$i$]))

$rm1$_brightness=sum(truncate(sample[$i$])+$rm1$[$i$]))

$rm2$_brightness=sum(truncate(sample[$i$])+$rm2$[$i$]))

$rm3$_brightness=sum(truncate(sample[$i$])+$rm3$[$i$]))

Furthermore, whilst an example has been given above in terms of brightness values, it will be appreciated that the technology described herein may be used in combination with any suitable data values, as desired. In that case, different reference values may be appropriate, e.g. depending on what the data values represent. For example, when the property being represented by the data values does scale in a linear fashion, in that case a standard linear sum may be more appropriate (e.g. as in the second example given above).

Thus, the reference values that are calculated and used may be calculated using any suitable and desired function of the data values within the block. For instance, in general, any other suitable reference value that is generally representative of a reference or average value for the original data array may be used, e.g. depending on the nature of the data values that are being encoded.

Thus, in general, for a given block of data, the representative values for the reference block and for the possible rounding modes may be determined as follows, by performing any suitable and desired function to the data values in question (and then selecting the rounding mode that best approximates the reference value):

reference_value=function(sample[$i$])

$rm0$_value=function((truncate(sample[$i$])+$rm0$[$i$]))

$rm1$_value=function(truncate(sample[$i$])+$rm1$[$i$]))

$rm2$_value=function(truncate(sample[$i$])+$rm2$[$i$]))

$rm3$_value=function(truncate(sample[$i$])+$rm3$[$i$]))

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of processing an array of data elements, each data element having an associated data value that is represented by a respective bit sequence, the method comprising:
for a block of data elements in the array of data elements:
representing the data values for each of the data elements in the block of data elements as truncated data values using a subset of one or more most significant bits of the respective bit sequences for the data values of the data elements; and
selecting from a plurality of available rounding modes a rounding mode to be applied when decoding the block of data elements, wherein each rounding mode is associated with one or more rounding bit sequence(s), and wherein the rounding mode to be applied when decoding the block of data elements is selected by:
determining a first representative value for the block of data elements based on data values for data elements in the block of data elements;
determining a corresponding representative value for the block of data elements for at least one of the plurality of available rounding modes, wherein the representative value for a rounding mode is determined based on the truncated data values for data elements in the block of data elements and the respective rounding bit sequence(s) associated with the rounding mode;
comparing the first representative value for the block of data elements determined based on the data values to the corresponding representative value determined for the at least one of the plurality of available rounding modes;
determining which of the plurality of available rounding modes gives a representative value that is closest to the first representative value; and
selecting the rounding mode of the plurality of available rounding modes that is determined to give a representative value that is closest to the first representative value that was determined for the block of data elements as the rounding mode to be applied when decoding the block of data elements;
the method further comprising:
encoding the block of data elements by storing the truncated data values for the data elements as a data packet representing the block of data elements and providing for the data packet data indicative of the rounding mode that is to be used when decoding the data packet; and when it is desired to use the data value(s) for one or more of the data element(s) in the block of data elements that has been encoded into the data packet, the method subsequently comprising:

passing the data packet to a decoder circuit for decoding together with the data indicative of the rounding mode that is to be used when decoding the data packet;

extracting the truncated data value(s) for the one or more data element(s); and adding the rounding bit sequence(s) associated with the indicated rounding mode to the truncated data value(s) to obtain decoded data value(s) for the one or more data element(s) in the block of data elements.

2. The method of claim 1, wherein the block of data elements is encoded as a fixed-size data packet.

3. The method of claim 1, wherein the selected rounding mode is included in a header for the data packet.

4. The method of claim 1, wherein a plurality of different encoding modes are available, one of the encoding modes comprising representing the data values for each of the data elements in the block of data elements as truncated data values using a subset of one or more most significant bits of the respective bit sequences; and encoding the block of data elements by adding the truncated data values for the data elements into a data packet;

the method comprising analysing the array of data elements to determine which one of a plurality of available encoding modes should be used for encoding the array of data elements; and signalling the determined encoding mode in a header for the data packet.

5. The method of claim 1, wherein the array of data elements represents an array of image data.

6. The method of claim 1, wherein determining the first representative value comprises performing a sum of the squares of the data values for at least some of the data elements within the block; and wherein determining the representative value for a respective rounding mode comprises performing a sum of the squares of modified data values for at least some of the data elements within the block, wherein the modified data value for a data element is obtained by adding the respective rounding bit sequence for the rounding mode to the truncated data value for the data element.

7. A method of encoding an array of data elements, each data element having an associated data value that is represented by a respective bit sequence, the method comprising:

for a block of data elements in the array of data elements:

representing the data values for each of the data elements in the block of data elements as truncated data values using a subset of one or more most significant bits of the respective bit sequences for the data values of the data elements; and selecting from a plurality of available rounding modes a rounding mode to be applied when decoding the block of data elements, wherein each rounding mode is associated with one or more rounding bit sequence(s), and wherein the rounding mode to be applied when decoding the block of data elements is selected by:

determining a first representative value for the block of data elements based on data values for data elements in the block of data elements;

determining a corresponding representative value for the block of data elements for at least one of the plurality of available rounding modes, wherein the representative value for a rounding mode is determined based on the truncated data values for data elements in the block of data elements and the respective rounding bit sequence(s) associated with the rounding mode;

comparing the first representative value for the block of data elements based on the data values to the corresponding representative value determined for the least one of the plurality of available rounding modes;

determining which of the plurality of available rounding modes gives a representative value that is closest to the first representative value; and selecting the rounding mode of the plurality of available rounding modes that is determined to give a representative value that is closest to the first representative value that was determined for the block of data elements as the rounding mode to be applied when decoding the block of data elements;

the method further comprising:

encoding the block of data elements by storing the truncated data values for the data elements as a data packet representing the block of data elements and providing for the data packet data indicative of the rounding mode that is to be used when decoding the data packet.

8. A method of decoding a data stream comprising one or more data packet(s), each data packet encoding a block of data elements within an array of data elements, wherein each data element in the block has an associated encoded data value, and wherein data indicative of one of a plurality of available rounding modes to be used when decoding the data packet is provided for the data packet, each rounding mode being associated with one or more rounding bit sequence(s), the method comprising:

when it is desired to use the data value(s) for one or more of the data element(s) in a block of data elements that has been encoded into a data packet:

reading the data packet to extract the encoded data value(s) for the one or more data element(s) in the block of data elements;

identifying, based on the data indicative of one of the plurality of available rounding modes, the rounding mode that is to be used when decoding the data packet; and adding the rounding bit sequence(s) associated with the identified rounding mode to the encoded data value(s) to obtain decoded data value(s) for the one or more data element(s) in the block of data elements.

9. A data processing system for processing an array of data elements, each data element having an associated data value that is represented by a respective bit sequence, the data processing system comprising:

an encoder circuit that is configured to:

for a block of data elements in the array of data elements:

represent the data values for each of the data elements in the block of data elements as truncated data values using a subset of one or more most significant bits of the respective bit sequences for the data values of the data elements; and select from a plurality of available rounding modes a rounding mode to be applied when decoding the block of data elements, each rounding mode being associated with one or more rounding bit sequence(s), wherein the selection of the rounding mode is performed by a rounding mode selection circuit that is configured to:

determine a first representative value for the block of data elements based on data values for data elements in the block of data elements;

determine a corresponding representative value for the block of data elements for at least one of the plurality of available rounding modes, wherein the representative value for a rounding mode is determined based on the truncated data values for data elements in the block of data elements and the respective rounding bit sequence(s) associated with the rounding mode;

compare the first representative value for the block of data elements determined based on the data values to the corresponding representative values determined for the at least one of the plurality of available rounding modes;

determine which of the plurality of available rounding modes gives a representative value that is closest to the first representative value; and select the rounding mode of the plurality of available rounding modes that is determined to give a representative value that is closest to the first representative value that was determined for the block of data elements as the rounding mode to be applied when decoding the block of data elements;

the encoder circuit being further configured to:

encode the block of data elements by storing the truncated data values for the data elements as a data packet representing the block of data elements and providing for the data packet data indicative of the rounding mode that is to be used when decoding the data packet;

the data processing system further comprising a decoder circuit that is configured to:

when it is desired to use the data value(s) for one or more of the data element(s) in a block of data elements that has been encoded into a data packet:

extract the truncated data value(s) for the one or more data element(s) in the block of data elements; and add the rounding bit sequence(s) associated with the indicated rounding mode to the truncated data value(s) to obtain decoded data value(s) for the one or more data element(s) in the block of data elements.

10. The data processing system of claim 9, wherein the encoder circuit is configured to encode a block of data elements as a fixed-size data packet.

11. The data processing system of claim 9, wherein the encoder circuit is configured to include the selected rounding mode in a header for the data packet.

12. The data processing system of claim 9, wherein a plurality of different encoding modes are available, one of the encoding modes comprising representing the data values for each of the data elements in the block of data elements as truncated data values using a subset of one or more most significant bits of the respective bit sequences; and encoding the block of data elements by adding the truncated data values for the data elements into a data packet;

The encoder circuit being configured to analyse an array of data elements to determine which one of a plurality of available encoding modes should be used for encoding the array of data elements; and signal the determined encoding mode in a header for the data packet.

13. The data processing system of claim 9, wherein the array of data elements represents an array of image data.

14. The data processing system of claim 9, wherein determining the first representative value comprises performing a sum of the squares of the data values for at least some of the data elements within the block; and wherein determining the representative value for a respective rounding mode comprises performing a sum of the squares of modified data values for at least some of the data elements within the block, wherein the modified data value for a data element is obtained by adding the respective rounding bit sequence for the rounding mode to the truncated data value for the data element.

15. An encoder for encoding an array of data elements, each data element having an associated data value that is represented by a respective bit sequence, the encoder comprising:

an encoding circuit that is configured to:

for a block of data elements in the array of data elements:

represent the data values for each of the data elements in the block of data elements as truncated data values using a subset of one or more most significant bits of the respective bit sequences for the data values of the data elements; and select from a plurality of available rounding modes a rounding mode to be applied when decoding the block of data elements, each rounding mode being associated with one or more rounding bit sequence(s), wherein the selection of the rounding mode is performed by a rounding mode selection circuit that is configured to:

determine a first representative value for the block of data elements based on data values for data elements in the block of data elements;

determine a corresponding representative value for the block of data elements for each of the plurality of available rounding modes, wherein the representative value for a rounding mode is determined based on the truncated data values for the data elements in the block of data elements and the respective rounding bit sequence(s) associated with the rounding mode;

compare the first representative value determined for the block of data elements to the corresponding representative value determined for the at least one of the plurality of available rounding modes;

determine which of the plurality of available rounding modes gives a representative value that is closest to the first representative value; and select the rounding mode of the plurality of available rounding modes that is determined to give a representative value that is closest to the first representative value that was determined for the block of data elements as the rounding mode to be applied when decoding the block of data elements;

the encoding circuit being further configured to:

encode the block of data elements by storing the truncated data values for the data elements as a data packet representing the block of data elements and providing for the data packet data indicative of the rounding mode that is to be used when decoding the data packet.

16. A decoder for decoding a data stream comprising one or more data packet(s), each data packet encoding a block of data elements within an array of data elements, wherein each data element in the block has an associated encoded data value, and wherein data indicative of one of a plurality of available rounding modes to be used when decoding the data packet is provided for the data packet, each rounding mode being associated with one or more rounding bit sequence(s), the decoder comprising a decoding circuit configured to:

when it is desired to use the data value(s) for one or more of the data element(s) in a block of data elements that has been encoded into a data packet:

read the data packet to extract the encoded data value(s) for the one or more data element(s) in the block of data elements;

identify, based on the data indicative of one of the plurality of available rounding modes, the rounding mode that is to be used when decoding the data packet; and add the rounding bit sequence(s) associated with the identified rounding mode to the encoded data value(s) to obtain decoded data value(s) for the one or more data element(s) in the block of data elements.

17. A non-transitory computer readable storage medium storing software code that when executing on a data processor performs a method as claimed in claim 1.

* * * * *